(12) United States Patent
Ilkov

(10) Patent No.: US 7,932,753 B2
(45) Date of Patent: Apr. 26, 2011

(54) POTENTIAL CONVERTER CIRCUIT

(75) Inventor: Nikolay Ilkov, Munich (DE)

(73) Assignee: Infineon Technologies AG, Neubiberg (DE)

( * ) Notice: Subject to any disclaimer, the term of this patent is extended or adjusted under 35 U.S.C. 154(b) by 127 days.

(21) Appl. No.: 12/398,382

(22) Filed: Mar. 5, 2009

(65) Prior Publication Data
US 2009/0289682 A1 Nov. 26, 2009

(30) Foreign Application Priority Data
Mar. 6, 2008 (DE) .......... 10 2008 012 809

(51) Int. Cl.
*G01R 19/22* (2006.01)
(52) U.S. Cl. .......... 327/104; 327/180; 327/197
(58) Field of Classification Search .......... 327/104, 327/180, 197
See application file for complete search history.

(56) References Cited

U.S. PATENT DOCUMENTS

| | | | | | |
|---|---|---|---|---|---|
| 4,382,198 | A | * | 5/1983 | Ishijima et al. | 327/309 |
| 5,440,224 | A | * | 8/1995 | Kimura | 323/313 |
| 5,627,461 | A | * | 5/1997 | Kimura | 323/312 |
| 5,825,214 | A | * | 10/1998 | Klosa | 327/104 |
| 5,910,749 | A | * | 6/1999 | Kimura | 327/541 |
| 5,990,727 | A | * | 11/1999 | Kimura | 327/513 |
| 6,528,979 | B2 | * | 3/2003 | Kimura | 323/313 |

FOREIGN PATENT DOCUMENTS

DE            31 00 297 A1 * 12/1981
WO     WO 03/032431 A2 * 4/2003

* cited by examiner

*Primary Examiner* — Lincoln Donovan
*Assistant Examiner* — John W Poos
(74) *Attorney, Agent, or Firm* — Slater & Matsil, L.L.P.

(57) ABSTRACT

Embodiments of a potential converter circuit include a converter for converting a bipolar input signal to a unipolar output signal that only consumes current at a change of potential of the input signal.

17 Claims, 4 Drawing Sheets

POTENTIAL CONVERTER CIRCUIT

This application claims priority to German Patent Application 10 2008 012 809.0, which was filed Mar. 6, 2008 and is incorporated herein by reference.

TECHNICAL FIELD

Embodiments of the present invention relate to a potential converter circuit, in particular, to a potential converter circuit for converting a bipolar input signal to a unipolar output signal.

BACKGROUND

In semiconductor circuits comprising MOSFET transistors, the reliability requirements limit a maximum occurring voltage across the gate oxide of the semiconductor to, for example, a value of approximately 3.6 volts (e.g., in the processing technology C7NP). That means a voltage between gate and source or gate and drain, respectively, of a MOSFET transistor should not have an amount of more than approximately 3.6 volts for ensuring reliable operation of the transistor. Direct driving of the gate with the bipolar input voltage of, for example, +/−3 volts can cause destruction of the transistor.

In order to avoid a bipolar input voltage from being applied directly at the input of the transistor, potential converter circuits are used.

SUMMARY OF THE INVENTION

According to embodiments, the present invention provides a potential converter circuit having a means for converting a bipolar input signal to a unipolar output signal that only consumes current at a change of potential of the input signal.

Since current is only consumed at a change of potential of the input signal, power will be consumed only in this case. Thus, the potential converter circuit can be operated in a highly power-efficient manner, since, contrary to conventional circuits, power is not consumed permanently but only for the short period of the change of potential of the input signal.

With the potential converter circuit, a bipolar logic signal, comprising, for example, the voltage range of $-V_{dd}$ to $+V_{dd}$ and thus having a maximum potential difference of $2*V_{dd}$ can be converted to a unipolar logic signal comprising, for example, the voltage range of 0 volts to $-V_{dd}$, and thus only having a maximum potential difference of $V_{dd}$. The converted unipolar logic signal allows reliable operation of the transistors in CMOS circuits, since only half the voltage swing of the bipolar input signal is applied to the transistors of the CMOS circuits, i.e., across the gate oxide of the transistors. Thus, it is possible to operate CMOS circuits reliably and with little power consumption.

The reduced power consumption in comparison to conventional circuits limits the process costs. Further, the lower power consumption allows scaling of the circuit with the semiconductor technology. The potential converter circuit can also be advantageously used in smaller structure sizes that are smaller than usual, e.g., in C7NP technology.

BRIEF DESCRIPTION OF THE DRAWINGS

Embodiments of the present invention will be detailed subsequently referring to the appended drawings, in which.

DETAILED DESCRIPTION OF ILLUSTRATIVE EMBODIMENTS

In the following, embodiments of the potential converter circuit will be discussed in detail with reference to the accompanying drawings FIGS. 1 to 4.

With regard to the subsequent description of the embodiments of the present invention it should be noted that for simplicity reasons, the same reference numbers are used in the whole description in the different figures for functionally identical, or equal or functionally equal, equivalent elements.

Figure 1:
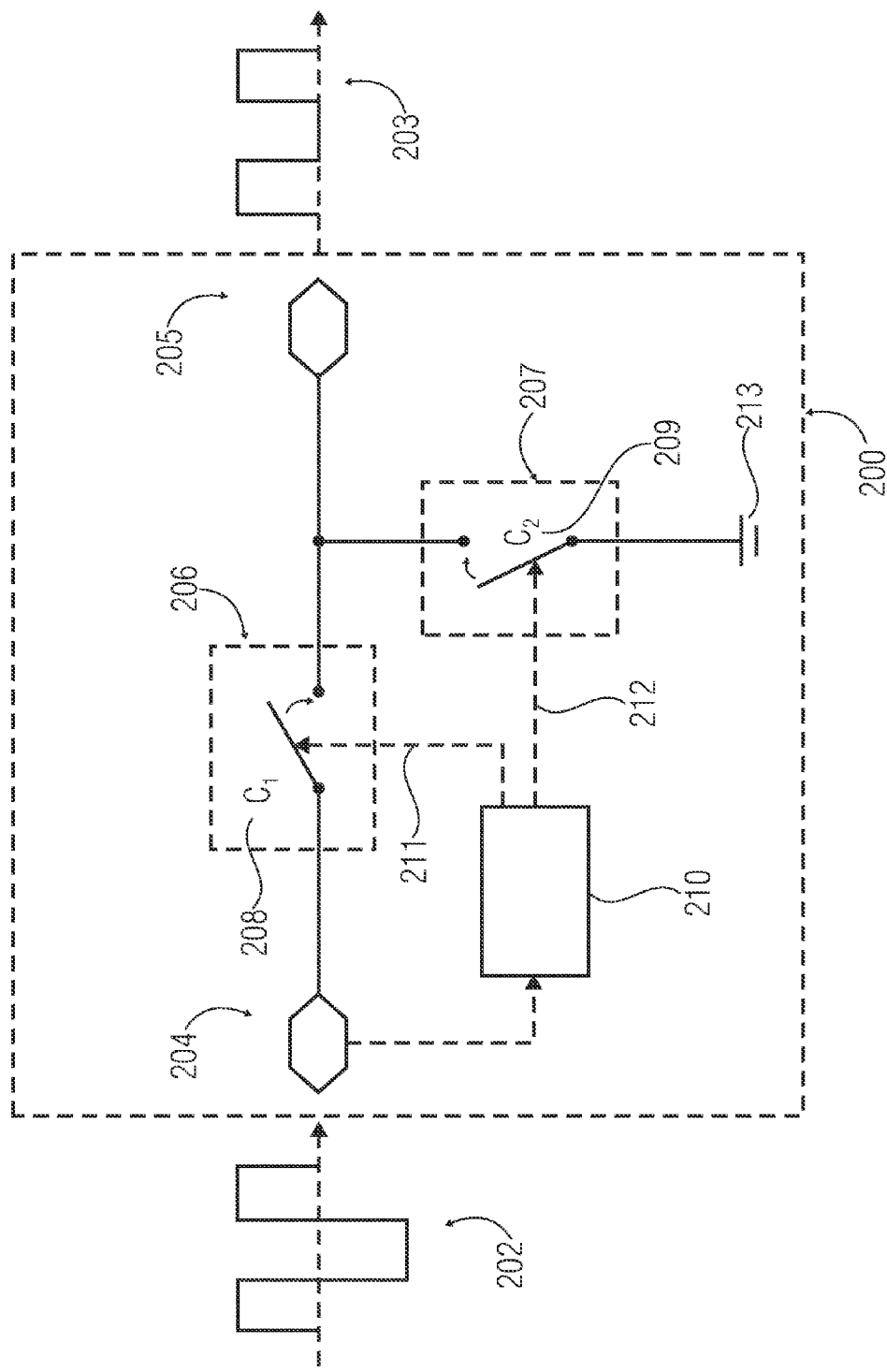
FIG. 1 is a circuit diagram of a potential converter circuit according to an embodiment of the invention.

FIG. 1 shows a circuit diagram of a potential converter circuit 200 according to an embodiment of the invention. A potential converter circuit 200 for converting a bipolar input signal 202 to a unipolar output signal 203 can have a first switch 206 and a second switch 207. In this embodiment, the first switch 206 is connected between an input 204 and an output 205 of the potential converter circuits 200 and has a first switching capacitance 208. In this embodiment, a second switch 207 is connected between the output 205 and a reference potential 213 of the potential converter circuit 200 and has a second switching capacitance 209. In this embodiment, the first switch 206 and the second switch 207 are configured for charging and discharging the switching capacitances 208, 209 of switches 206, 207 only at a change of potential of the input signal 202. For ensuring this mode of operation, the potential converter circuit 200 has a control 210, which is implemented to control the first switch 206 by using a first control signal 211 and the second switch 207 by using a second control signal 212. The control 210 generates the two control signals 211, 212 in dependence on the input signal 202.

For generating the unipolar output signal 203 from the bipolar input signal 202, the control 210 can control, for example, closing of the first switch 206 with the first control signal 211 at a positive signal value of the input signal 202, and opening of the second switch 207 with the second control signal 212, and control opening of the first switch 206 with the first control signal 211 at a negative signal value of the input signal 202, and control closing of the second switch 207 with the second control signal 212. This means that at a positive signal value of the input signal 202, the first switch 206 is closed and the second switch 207 is opened, such that the positive potential or the positive signal value, respectively, of the input signal 202 is switched through to the output 205, such that the output signal 203 has a positive signal value. On the other hand, at a negative signal value of the input signal 202, the first switch 206 is opened and the second switch 207 is closed, such that the reference potential 213 is applied at the output 205, for example, ground or zero volts, respectively. This corresponds to a mode of operation of the potential converter circuit 200 according to the illustration in FIG. 1. The output signal 203 is a unipolar signal with the positive potential of the input signal 202 and the reference potential 213.

On the other hand, the control 210 can also control, for example, opening of the first switch 206 with the first control signal 211 at a positive signal value of the input signal 202, and control closing of the second switch 207 with the second control signal 212, and, at a negative signal value of the input signal 202, control closing of the first switch 206 with the first control signal 211, and control opening of the second switch 207 with the second control signal 212. In this case, at a positive signal value of the input signal 202, the first switch 206 is opened and the second switch 207 is closed. Thus, the common reference potential 213 is applied to the output 205. At a negative signal value of the input signal 202, however, the first switch 206 is closed and the second switch 207 is opened, such that the negative signal value of the input signal 202 can be connected freely to the output 205. Thus, the output signal 203 has the inverse waveform according to the illustration in FIG. 1, this means a change of negative potential, for example, −3 volts, and common potential, for example, 0 volts.

The control signals 211, 212 of the control 210 can, for example, be voltages. The first switch 206 and the second switch 207 can, for example, be MOSFET transistors, such that the control signals 211, 212 are, for example, the control voltages of the MOSFET transistors applied between gate and source or gate and drain. The MOSFET transistors can, for example, be transistors of the same type, they can, for example, be n-channel MOSFET transistors or p-channel MOSFET transistors. They can be transistors of the enhancement type or of the depletion type. For example, the MOSFET transistors can be produced in C7NP semiconductor technology. An implementation of the first switch 206 and the second switch 207 as MOSFET transistors will be described in more detail in the two following embodiments according to FIGS. 2 and 3.

Generally, the potential converter circuits 200, 100 can also be seen as rectifier circuits, since the same convert a bipolar input signal 202, 102, to a unipolar output signal 203, 103. The input signal 202, 102 can, for example, also be an alternating current or an alternating voltage, which can, for example, be a sinusoidal signal. The potential converter circuit 200, 100 blocks when the positive signal portion is applied, and passes only the negative signal portion, or blocks when the negative signal portion is applied and passes only the positive signal portion. This is the mode of operation of a rectifier.

Figure 2:
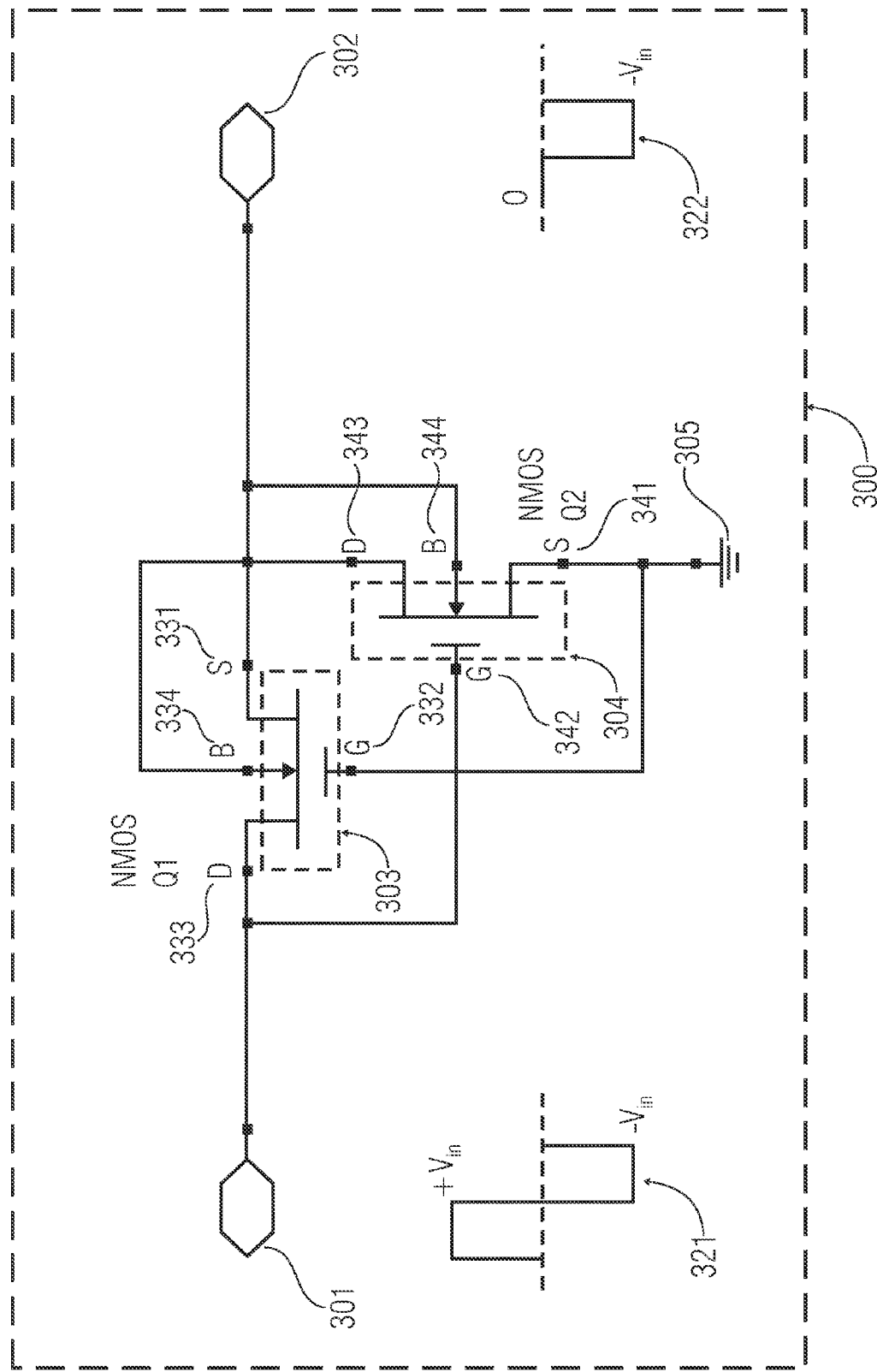
FIG. 2 is a circuit diagram of a potential converter circuit according to a further embodiment of the invention.

FIG. 2 shows a circuit diagram of a potential converter circuit 300 according to a further embodiment of the invention. The potential converter circuit 300 has an input 301, an output 302, a first MOSFET transistor 303 and a second MOSFET transistor 304. The first MOSFET transistor 303 has a source terminal 331, a drain terminal 333, a gate terminal 332 and a bulk terminal 334. The second MOSFET transistor 304 has a source terminal 341, a drain terminal 343, a gate terminal 342 and a bulk terminal 344. Both transistors 303, 304 are connected to the input 301, the output 302, a reference potential 305 and to each other such that the source terminal 331 of the first MOSFET transistor 303 is connected to the output 302, the drain terminal 333 of the first MOSFET transistor 303 is connected to the input 301, and that the gate terminal 332 of the first MOSFET transistor 303 is connected to the reference potential 305. Further, the source terminal 341 of the second MOSFET transistor 304 is connected to the reference potential 305, the drain terminal 343 of the second MOSFET transistor 304 is connected to the output 302, and the gate terminal 342 of the second MOSFET transistor 304 is connected to the input 301. The bulk terminals 334, 344 of the two transistors 303, 304 are connected to the output 302 of the potential converter circuit 300 to avoid stress due to a higher voltage.

Thus, the circuit structure of the potential converter circuit 300 connects the first MOSFET transistor 303 to a common gate circuit. A gate circuit is one of three basic circuits of field effect transistors. Here, the drain terminal 333 of the first transistor 303 serves as input 301, the source terminal 331 of the first transistor 303 serves as output 302, and the gate terminal 332 of the first transistor 303 as common input 301 and output 302. Since the gate terminal 332 of the transistor 303 is connected to a reference potential 305, to which the input signal 321 at the input 301 relates, and to which the output signal 322 at the output 302 relates, the gate terminal 332 is common with regard to the input 301 and the output 302. The reference potential 305 can represent, for example, a ground potential or a common ground potential, respectively. In the waveforms according to FIG. 2, the reference potential 305 corresponds to the zero line. The input signal 321 is a bipolar input signal, the same can have, for example, the positive potential $+V_{in}$ and the negative potential $-V_{in}$. The output signal 322 is a unipolar output signal, the same has a first signal value corresponding to the reference potential 305, and the same has a second signal value that can, for example, be $-V_{in}$ or $+V_{in}$, i.e., corresponds to the negative or positive potential of the input signal 321.

The second MOSFET transistor 304 is connected via a common-source circuit. A source circuit is a further one of three basic circuits of field effect transistors. In the source circuit, the gate terminal 342 of the second transistor 304 serves as input 301 and the drain terminal 343 of the second transistor 304 serves as output 302, and the source terminal 341 of the second transistor 304 is both input 301 and output 302. The source terminal 341 of the second transistor 304 is connected to the reference potential 305, to which both the input 301 and the output 302 are related. Thus, the source terminal 341 is implemented as common-source circuit with regard to input 301 and output 302.

The potential converter circuit 300 comprises a first metal-oxide field effect transistor 303, which is implemented as an n-channel MOSFET transistor in this embodiment and is operated in a gate circuit, and a second metal-oxide field effect transistor 304, which is also implemented as an n-channel MOSFET transistor in this embodiment, and is operated in a source circuit. Both transistors 303, 304 can be operated in the enhancement mode. The gate terminal 332 of the first transistor 303 and the source terminal 341 of the second transistor 304 are on a reference potential 305, which can, for example, be a common ground potential. The source terminal 331 of the first transistor 303 and the drain terminal 343 of the second transistor 304 are connected to the output 302. The drain terminal 333 of the first transistor 303 and the gate terminal 342 of the second transistor 304 are connected to the input 301.

The potential converter circuit 300 converts a bipolar input signal 321 to a unipolar output signal 322. If, for example, the positive portion $+V_{in}$ of the input signal 321 is applied to the input 301, the potential $+V_{in}$ is also applied to the drain terminal 333 of the first transistor 303 and to the gate terminal 342 of the second transistor 304. In this embodiment, the reference potential 305 corresponds to a common ground, i.e., it has a potential value of zero. Thus, the potential value 0 is also applied to the source terminal 341 of the second transistor 304 and to the gate terminal 332 of the first transistor 303. Thus, the voltage between gate 342 and source 341 of the second transistor 304 corresponds to the input potential $+V_{in}$. Since the input potential $+V_{in}$ is higher than a threshold voltage $V_{th}$ of the transistors 303, 304 in the common mode of operation of the potential converter circuit 300, this means that the second transistor 304 is conductive. Thus, the potential 0 of the source input 341 of the second transistor 304 is switched to the drain terminal 343 of the second transistor 304 and is applied at the same time to the output 302 of the potential converter circuit 300. Additionally, the potential 0 of the source terminal 341 of the second transistor 304, which is conductive, is also applied to the source terminal 331 of the first transistor 303 as well as to the bulk terminal 334 of the first transistor 303 and to the bulk terminal 344 of the second transistor 304. Thus, the voltage between the gate terminal 332 of the first transistor 303 and the source terminal 331 of the first transistor 303 equals zero, and is thus smaller than a threshold voltage $V_{th}$, which means that the first transistor 303 is non-conductive. The potential $+V_{in}$ applied to the drain terminal 333 of the first transistor 303 is not switched to the output 302. The output 302 has the potential zero.

If the negative portion of the input signal 321, for example, with the potential $-V_{in}$ is applied to the input 301, then the potential $-V_{in}$ is also applied to the drain terminal 333 of the first transistor 303 as well as to the gate terminal 342 of the second transistor 304. The reference potential 305, which means the potential zero is further applied to the source terminal 341 of the second transistor 304 and to the gate terminal 332 of the first transistor 303. The voltage between gate 342 of the second transistor 304 and source 341 of the second transistor 304 is $-V_{in}$, and is thus smaller than the threshold voltage $V_{th}$ of the second transistor 304. This means the second transistor 304 is non-conductive at negative potentials $-V_{in}$ to the input 301. If the potential zero is applied to the gate terminal 332 of the first transistor 303 and the negative potential $-V_{in}$ at the drain terminal 333 of the first transistor 303, then the potential of the gate terminal 332 is positive compared to the drain terminal 333, the voltage between gate 332 and drain 333 of the first transistor 303 corresponds thus to $+V_{in}$, i.e., for example, 3 volts and is thus higher than the threshold voltage $V_{th}$. In common MOSFET transistors, threshold voltages $V_{th}$ can, for example, be in the range of about 0.7 to 0.2 volts. At a voltage between gate 332 and drain 333 of the first transistor 303 of $V_{in}$, which is higher than the threshold voltage, the first transistor 303 is conductive. The potential $-V_{in}$ of the drain terminal 333 is switched through to the source terminal 331 of the first transistor 303 and thus also to the output 302 of the potential converter circuit 300. The potential of the drain terminal 333 of the first transistor 303 is also switched through to the bulk terminal 334 of the first transistor 303, to the drain terminal 343 of the second transistor 304 and to the bulk terminal 344 of the second transistor 304. The voltage between gate 332 and source 331 of the first transistor 303 corresponds also to $+V_{in}$ and is thus also higher than the threshold voltage $V_{th}$ of the first transistor 303. The transistor 303 remains in the conductive state.

Due to the connectivity of the potential converter circuit 300, at a positive input voltage, which is higher than the threshold voltage $V_{th}$, the first transistor 303 is non-conductive (potential of gate compared to drain is negative) and the second transistor 304 is conductive (potential of gate compared to source is positive) such that the reference potential 305 is switched to the output 302. At a negative input signal 321, the first transistor 303 is conductive (potential of gate compared to drain is positive) and the second transistor 304 is non-conductive (potential of gate compared to source is negative), such that the negative input potential is switched through from the input 301 to the output 302. A negative unipolar output signal 322 is generated from a bipolar input signal 321.

According to its mode of operation, the first transistor 303 corresponds to the first switch 206 according to FIG. 1, and according to its mode of operation, the second transistor 304 corresponds to the second switch 207 according to FIG. 1.

Figure 3:
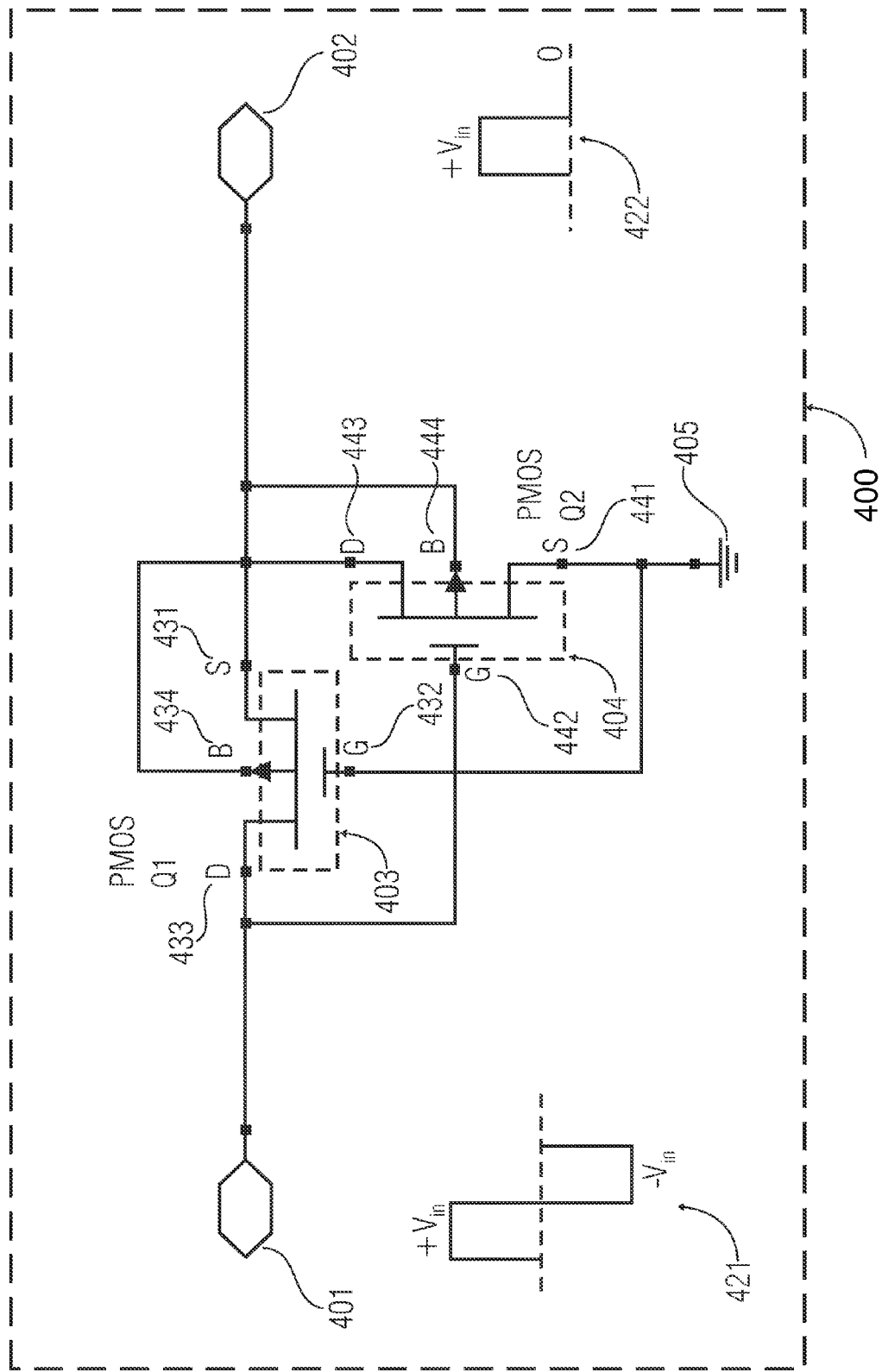
FIG. 3 is a circuit diagram of a potential converter circuit according to a further embodiment of the invention.

FIG. 3 shows a circuit diagram of a potential converter circuit 400 according to a further embodiment of the invention. The potential converter circuit 400 has the same components and the same connectivity as the potential converter circuit 300, the bulk terminals 434, 444 are also connected to the output 402. The difference is that the two transistors 403, 404 are implemented as p-channel metal-oxide field effect transistors. This results in a different functionality, which will be described below.

In p-channel MOSFET transmitters, the transistor is conductive when the potential difference of gate terminal and source terminal becomes smaller than a negative threshold voltage, and the transistor is non-conductive when the potential difference of gate terminal and source terminal becomes higher than the negative threshold voltage. In a bipolar input signal 421, applied to the input 401, and having the two polarities $+V_{in}$ and $-V_{in}$, the following behavior results: If the positive potential $+V_{in}$ is applied to the input 401, the same is also applied to the drain terminal 433 of the first transistor 403 and to the gate terminal 442 of the second transistor 404. A common potential 405, for example, with the potential 0, is applied to the source terminal 441 of the second transistor 404 and to the gate terminal 432 of the first transistor 403. The potential difference between gate terminal 442 of the second transistor 404 and source terminal 441 of the second transistor 404 corresponds then to $+V_{in}$, is thus higher than a negative threshold voltage $-V_{th}$, such that the second transistor 404 is non-conductive. At the first transistor 403, the potential difference between gate terminal 432 and drain terminal 433 is equal to the negative input potential, i.e., $-V_{in}$. At common values of the input potential $V_{in}$ of approximately 3 volts, where the potential converter circuit 400 can be operated, and at common threshold voltages of approximately 0.7 to 0.2 volts, which MOSFET transistors 403, 404 have, the potential difference between gate 432 and drain 433 of the first transistor 403 is smaller than a negative threshold voltage $-V_{th}$, such that the first transistor 403 is conductive. The potential of drain terminal 433 is switched to the source terminal 431 of the first transistor 403 and is also applied to the output 402 of the potential converter circuit 400. The potential $+V_{in}$ of the source terminal 431 of the first transistor 403 is also applied to the bulk terminal 434 of the first transistor 403, to the drain terminal 443 of the second transistor 404 and to the bulk terminal 444 of the second transistor 404. The potential difference between gate terminal 442 of the second transistor 404 and drain terminal 443 of the second transistor 404 is thus equal to zero, and thus still higher than the negative threshold voltage $-V_{th}$, such that the second transistor 404 is still non-conductive.

This means that at a positive potential of the input signal 421, the output signal 422 at the output 402 also has positive potential.

If the negative potential $-V_{in}$ of the input signal 421 is applied to the input 401, the same will also be applied to the drain terminal 433 of the first transistor 403 and to the gate terminal 442 of the second transistor 404. The potential difference between the gate terminal 442 of the second transistor 404 and source terminal 441 of the second transistor 404 is thus equal to $-V_{in}$, which means it is smaller than the negative threshold voltage $-V_{th}$, such that the second transistor 404 is conductive. Thus, the second transistor 404 switches the reference potential 405 or the potential 0, respectively, to the drain terminal 443 of the second transistor 404 and to the output 402. The potential 0 is also switched to the source terminal 431 of the first transistor 403, to the bulk terminal 434 of the first transistor 403 and to the bulk terminal 444 of the second transistor 404. Thus, the potential difference between the gate terminal 432 and source terminal 431 of the first transistor 403 equals zero, is thus higher than the negative threshold voltage $-V_{th}$, such that the first transistor 403 remains non-conductive. This means a negative potential of the input signal 421 does not reach the output 402, due to the non-conductive state of the first transistor 403.

The potential converter circuit 400 is implemented such that a positive potential of the input signal 421 is switched to the output 402, and the first transistor 403 is non-conductive at a negative potential of the input signal 421, and at the same time the second transistor 404 is conductive to switch the reference potential 405 to the output 402. Thus, the first transistor 403 corresponds to the first switch 206 according to FIG. 1 in its mode of operation, and the second transistor 404 corresponds to the second switch 207 according to FIG. 1 in its mode of operation. Either the potential of the input 401 or the potential of the reference potential 405 is switched to the output 402. One of the transistors 403, 404 each is conductive, while the other one is non-conductive. The switching process takes place reliably when the potential at the input is higher than the positive threshold voltage or smaller than the negative threshold voltage, respectively, wherein the threshold voltages correspond to the threshold voltages of metal-oxide field effect transistors.

The transistors 403, 404 can, for example, be of the enhancement type, the same can be produced, for example, in a C7NP semiconductor technology. In the potential converter circuits 300, 400 of the embodiments according to FIG. 2 and FIG. 3, current flow only occurs at the switching processes for reloading the gate capacities of the transistors. Thus, power is only consumed in the switching process for charging or discharging the capacitances. Further, it has to be noted that the highest amount of the potential across the gate oxide of both transistors 303, 403 or 304, 404, respectively, does not exceed the potential $V_{in}$. In no state, in which the circuit 300, 400 is, a double amount is applied across the gate oxide of one of the transistors, i.e., $2*V_{in}$. Thus, the transistors 303, 403 or 304, 404, respectively can operate in an approved voltage range. Further, the potential converter circuit 300, 400 can be implemented on a semiconductor substrate in a very space-saving manner, since only two transistors are necessary for realizing the circuit. This has the advantage that the switching velocity is increased compared to common circuits necessitating a larger number of transistors.

Figure 4:
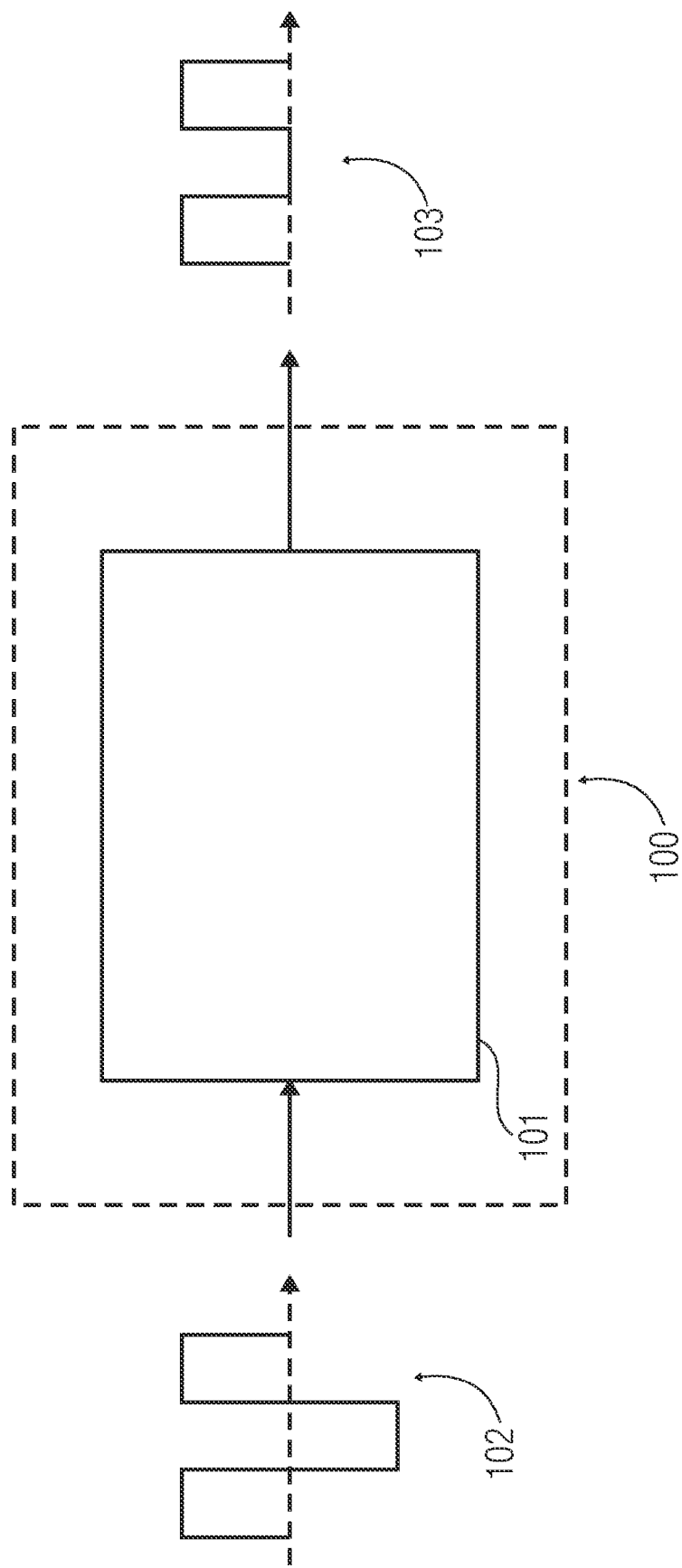
FIG. 4 is a circuit diagram of a potential converter circuit according to a further embodiment of the invention.

FIG. 4 shows a circuit diagram of a potential converter circuit 100 according to a further embodiment of the invention. In this embodiment, the potential converter circuit 100 comprises a means 101 for converting a bipolar input signal 102 to a unipolar output signal 103, which only consumes current at a change of potential of the input signal 102. This means, if the bipolar input signal 102 changes, for example, from a positive voltage to a negative voltage or vice versa, current and thus power is consumed in the means 101 for converting the bipolar input signal 102 to the unipolar output signal 103.

The means 101 can have, for example, two MOSFET transistors of the same type, whose capacitances are only charged and discharged at a change of potential of the input signal 102. For example, both of the two MOSFET transistors can be n-channel or p-channel MOSFET transistors. The MOSFET transistors can be of the enhancement type or of the depletion type. The means 101 can also have other types of transistors, for example, JFET transistors (JFET=junction field effect transistor), IGBT transistors (IGBT=insulated gate bipolar transistor), TFT transistors (TFT=thin film transistor), photo transistors or others.

In the following, embodiments of the present invention will be described again in other words. For reducing the supply voltage in highly linear CMOS circuits and for excluding the usage of DC blocking capacitors, the gate terminals of the switching transistors are operated in highly linear CMOS circuits with bipolar voltage. Since the control circuit should operate with standard logic potentials, a potential converter is necessary for converting a unipolar to a bipolar signal. The inventive potential converter converts a bipolar to a unipolar signal and can be used in the feedback path of the transistor driver circuit. Since the reliability requirement limits a maximum voltage across the gate oxide to, for example, 3.6 volts in the C7NP technology, the direct approach allows no switching of +/−3 volts. Recently, an ohmic potential converter has been used with a common gate transistor. However, this approach consumes current that can be provided, for example, by the embedded charging pump, and necessitates a large area. A second approach with capacitively coupled logic has also been tested, but has been given up because the circuit was in an undefined state after applying the supply voltage. The inventive solution allows the operation of standard logic cells without drawing additional current. It needs remarkably little area on the chip and satisfies the reliability requirements. Embodiments of the invention represent a combination of MOSFET transistor switches in a common gate and a common source circuit for performing the potential conversion. Embodiments of the invention represent a reliable low-power potential converter. The potential converter circuit according to embodiments of the invention converts a bipolar logic signal, i.e., a signal ranging from, for example, $-V_{dd}$ to $+V_{dd}$ and thus including a voltage range of $2*V_{dd}$, to a unipolar logic signal, which ranges, for example, from 0 volts to $-V_{dd}$, without providing the gate oxide of the transistor with more than half the voltage swing of the input signal. This has the effect of increasing the reliability of the transistors in CMOS circuits.

In embodiments of the invention, the potential converter circuit comprises a first NMOS transistor Q1 in a common gate circuit and a second NMOS transistor in a common source circuit. Both transistors operate in the enhancement mode. The gate of the transistor Q1 and the source terminal of the transistor Q2 are on a common ground potential, the source terminal of Q1 and the drain terminal of Q2 are connected to the output. The drain terminal of Q1 and the gate of Q2 are connected to the input. If the same is positive with regard to ground, the input voltage $+V_{in}$ is applied to the input. The transistor Q2 becomes conductive when the input voltage $V_{in}$ is higher than a threshold voltage $V_{th}$ of the respective transistor, such that Q2 provides a current path with low resistance from the output to ground. Q1 becomes non-conductive, since its gate potential is negative both with regard to source and to drain. The highest potential with regard to the gate terminals is $V_{gd}$. Q1=$V_{gs}$, Q2=$V_{in}$. At a negative voltage $-V_{in}$, Q1 becomes conductive for $V_{in}$ larger $V_{th}$, for providing a current path with low resistance at the input. The highest potential across the gate oxide of both transistors does not exceed $V_{in}$. The only current necessitated by the circuit is the one for reloading the gate capacities during the switching process. A similar circuit can be designed for positive logic by using two PMOS transistors. In this case, the bipolar input logic signal is converted from $+V_{dd}/-V_{dd}$ to $V_{dd}/0$ volts.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents that fall within the true spirit and scope of the present invention.

What is claimed is:

1. A potential converter circuit for converting a bipolar input signal to a unipolar output signal, the circuit comprising:
a first switch coupled between an input and an output and comprising a first switching capacitance;
a second switch coupled between the output and a reference potential and comprising a second switching capacitance; and
a control, wherein the control is configured for controlling the first switch using a first control signal and the second switch using a second control signal, wherein the first and second control signals are derived from the input signal;
wherein the first switch and the second switch are configured for charging and discharging the switching capacitances of the switches only at a change of potential of the input signal, and
wherein the control is configured for closing or opening the first switch at a positive signal value of the input signal using the first control signal, and for opening or closing the second switch using the second control signal, and for opening or closing the first switch at a negative signal value of the input signal using the first control signal, and for closing or opening the second switch using the second control signal.

2. The potential converter circuit according to claim 1, wherein the first switch and the second switch comprise MOSFET transistors of the same type.

3. The potential converter circuit according to claim 2, wherein the first switch is controlled by a first control signal and the second switch is controlled by a second control signal, the first and second control signals being voltages between gate and source or between gate and drain of the MOSFET transistors.

4. The potential converter circuit according to claim 2, wherein the first switch and the second switch comprise n-channel MOSFET transistors or p-channel MOSFET transistors.

5. The potential converter circuit according to claim 2, wherein the MOSFET transistors are enhancement type transistors.

6. The potential converter circuit according to claim 2, wherein the MOSFET transistors are implemented in a C7NP technology.

7. A potential converter circuit for converting a bipolar input signal to a unipolar output signal, the circuit comprising:
an input;
an output;
a first MOSFET transistor comprising a source terminal connected to the output, a drain terminal connected to the input, and a gate terminal connected to a reference potential; and
a second MOSFET transistor comprising a source terminal connected to the reference potential, a drain terminal connected to the output, and a gate terminal connected to the input,
wherein the input carries a bipolar logic signal, and
wherein the bipolar logic signal describes two logic states that are predetermined by a positive supply voltage and a negative supply voltage.

8. The potential converter circuit according to claim 7, wherein the first MOSFET transistor and the second MOSFET transistor are n-channel transistors.

9. The potential converter circuit according to claim 7, wherein the first MOSFET transistor and the second MOSFET transistor are p-channel transistors.

10. The potential converter circuit according to claim 7, wherein the first and second MOSFET transistors are enhancement type transistors.

11. The potential converter circuit according to claim 7, wherein a bulk terminal of the first MOSFET transistor and a bulk terminal of the second MOSFET transistor are connected to the output.

12. The potential converter circuit according to claim 7, wherein the output carries a unipolar logic signal.

13. A potential converter circuit for converting a bipolar input signal to a unipolar output signal, the circuit comprising:
an input;
an output;
a first MOSFET transistor comprising a source terminal connected to the output, a drain terminal connected to the input, and a gate terminal connected to a reference potential; and
a second MOSFET transistor comprising a source terminal connected to the reference potential, a drain terminal connected to the output, and a gate terminal connected to the input,
wherein the output carries a unipolar logic signal, and
wherein the unipolar logic signal describes two logic states that are predetermined by a negative or positive supply voltage, respectively, and a reference potential.

14. The potential converter circuit according to claim 7, wherein the first MOSFET transistor is connected in a gate circuit.

15. The potential converter circuit according to claim 7, wherein the second MOSFET transistor is connected in a source circuit.

16. The potential converter circuit according to claim 7, wherein the reference potential is a ground potential.

17. The potential converter circuit according to claim 7, wherein the MOSFET transistors are implemented in a C7NP technology.

* * * * *